United States Patent Office 3,214,966
Patented Nov. 2, 1965

3,214,966
INSTRUMENTS FOR INDICATING THE "GOING" OF RACECOURSES AND THE LIKE
Duncan Neil Menzies, Weymouth, Dorset, England, assignor to John Gibson Semmes, Washington, D.C., and John C. K. Shipp, Rockville, Md.
Filed Aug. 30, 1962, Ser. No. 220,368
Claims priority, application Great Britain, Sept. 12, 1961, 32,688/61
4 Claims. (Cl. 73—79)

This invention relates to instruments for indicating the "going," that is to say, the degree of hardness, of the ground surface, such instruments being intended particularly, but not exclusively, for use on racecourses and the like.

Known "going" indicators usually take the form of a penetrometer having a projection which is caused to penetrate the ground surface in response to a predetermined application of force, the depth of penetration in each instance being used to give an indication of the hardness of the ground or "going." However, such instruments fail to take full account of the thickness and texture of the grass on the ground surface, in the absence of which a reliable indication cannot be obtained for purposes such as horse-racing. At racecourses which do not have a relatively thick covering of grass, such racecourses being common practice in some countries, other means are employed to prevent jarring of the horses' hooves. For example, a top covering of one or more materials such as soil, peat or cinders is used. Accordingly, it is an object of the invention to provide a simple and robust instrument by which a reliable indication can be readily obtained and in which the disadvantage mentioned above is overcome or at least substantially minimized. A further object of the invention is to provide an instrument by which an accurate comparison can be made between "going" on grass and on other top coverings such as the kinds mentioned above.

According to the invention there is provided an instrument for indicating the "going" of the ground surface comprising means for contacting the ground, a guide connected to and adapted to be vertically or substantially vertically disposed above said contacting means, a weight slidable vertically or substantially vertically along the guide, resilient means arranged at the lower end of the guide in the path of said weight and means by which the distance of the weight from said contacting means can be ascertained.

For a better understanding of the invention, and to show how the same may be carried into effect reference will now be made, by way of example, to the accompanying drawings.

Figure 1:
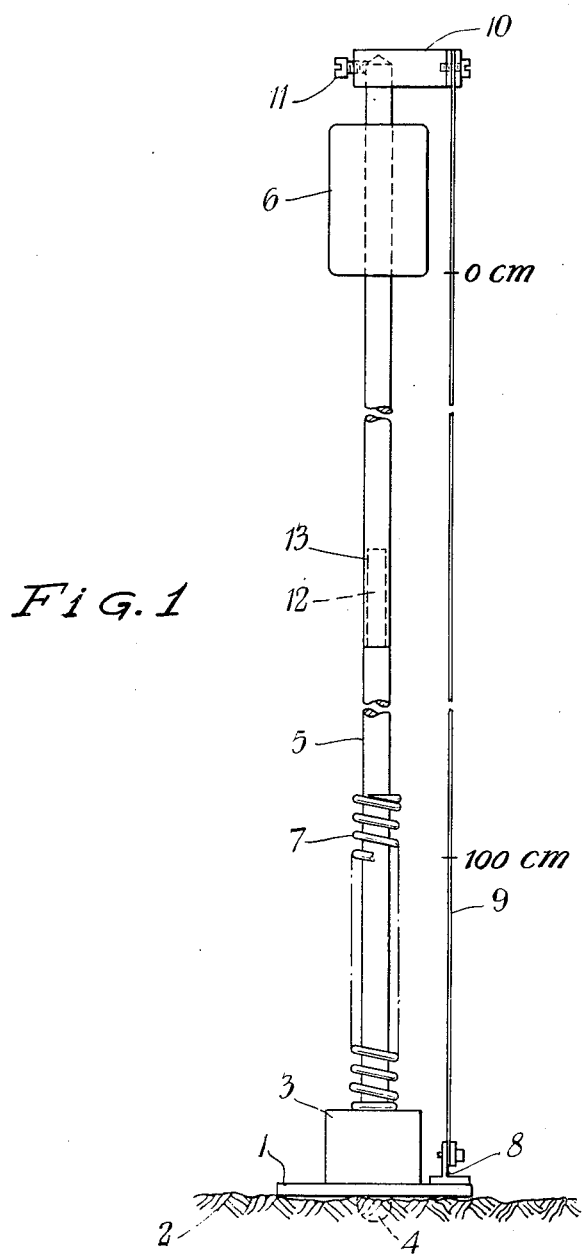
FIGURE 1 is an elevation view of an instrument made in accordance with the invention.

The instrument has a flat circular disc 1 of 4" in diameter and ¼" in thickness, one side of which disc is intended to contact the ground surface 2 during the use of the instrument. The opposite or upper side of the disc 1 has a cylindrical central block 3 clamped to it with the aid of a nut 4, the block 3 having a diameter of 2" and a height of 1½". A guide in the form of a rod 5 of circular cross section is entered through the block 3 and is welded to its upper and lower surfaces so as to project therefrom in a direction perpendicular to the plane of the disc 1. The rod 5 has a diameter of ½" and a length or height of 64" and it will be appreciated that, when the lower side of the disc 1 is placed in contact with the ground surface 2, the rod 5 will extend vertically or substantially vertically above it.

A circular cylindrical weight 6 is formed with a bore whose longitudinal axis coincides with that of the weight and the rod 5 is entered through this bore so that, in use of the instrument, the weight 6 is freely slidable up and down the rod in a vertical or substantially vertical direction. The weight 6 is of 2½ lbs. Resilient means in the form of a coiled compression spring 7 is arranged around the lower end of the rod 5, the lower end of the spring 7 bearing against the uppermost surface of the block 3 whilst the upper end is disposed in the path of the weight 6. The spring 7 has 22 turns and, when in a non-compressed state, has a length of 6½".

The upper side of the disc 1 is provided, at a location close to its edge, with an anchorage 8 for one end of a flexible stainless steel measuring tape 9 of ½" in width, the other end of the tape 9 being arranged to be secured to a bracket 10 which can be fastened to the uppermost end of the rod 5 with the aid of a blind hole and a set screw 11. The arrangement is such that, in use, the tape 9 extends vertically or substantially vertically parallel to the rod 5 but just clear of the path of movement of the weight 6.

In the use of the instrument, the lower side of the disc 1 is placed in contact with the ground surface 2 and the rod 5 is held vertically or substantially vertically by the person, or one of the persons, operating the instrument. The weight 6 is then raised by hand to a position in which it abuts against the underside of the bracket 10. The weight 6 is subsequently released so that it slides down the rod 5 under gravity and strikes the uppermost end of the coiled compression spring 7. The spring 7 which is momentarily compressed between the lowermost side of the weight 6 and the uppermost side of the block 3, then reverses the direction of movement of the weight 6 and repels it a certain distance up the rod 5. The operator, or one of the operators, notes the mark on the calibrated tape 9 which is opposite the highest point reached by the weight 6. The tape 9 has, in fact, a scale calibrated in 100 equal divisions of one centimetre each, the uppermost or zero calibration being disposed at the level of the rod 5 which would be reached by the weight 6 after being repelled by the spring 7 when the disc 1 was resting on absolutely rigid material such as solid concrete. This level is 13" below the bracket 10, as illustrated in FIGURE 1. It will be appreciated that, if the disc 1 is resting upon ground which is soft and/or covered with thick grass, the kinetic energy of the descending weight 6 will be absorbed by the ground to a much greater extent than when the disc is resting upon hard and/or substantially grass free ground so that the weight 6 will be repelled up the rod 5 to a correspondingly lower level.

A reliable indication of the "going" at a racecourse can be obtained by making a number of determinations in the manner described at a variety of different points on the course. A record is kept of the number of determinations and of the different results and from these figures an average reading for the whole course can be readily obtained. This reading will be found by comparison with records to correspond more or less with one of the conventional verbal descriptions of the "going," such as, for example, "firm," "good" or "soft." Alternatively or additionally, the figures may be employed in determining accurate race-distance "going" allowances for use in race-winner merit assessments. Furthermore, differing figures for the various regions of a racecourse give an accurate indication of the areas which require watering during dry weather.

The rod 5 is of a substantial length and, for ease of carrying the instrument, the said rod is arranged so that it can be split into upper and lower sections. These sections can be fitted together to form a single length with the aid of a projection 12 formed at the uppermost end of the lower section and a co-operating socket 13 formed at the lowermost end of the upper section. The projection 12 and socket 13 make a frictional engagement with one another, the arrangement being such that, when the two sections are fixed together, the outermost surface of the rod 5 is substantially unbroken.

Figure 2:
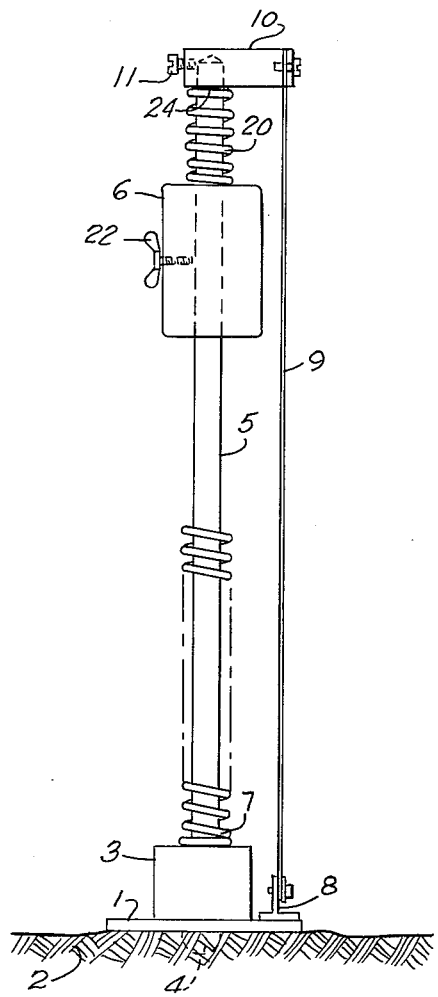
FIGURE 2 is an elevation view of a modification of the instrument used in accordance with the invention.

In accordance with a modification of the invention, the length of the rod 5 may be reduced, so that it is unnecessary to divide it into sections, by providing a coiled compression spring, similar to the spring 7, at the upper end of the rod 5 with one of its ends bearing against the bracket 10, whilst the other end is in the path of the weight 6. This is illustrated in FIGURE 2 which shows spring 20 in contact with bracket 10 at point 24. The bracket 10 has connected to it means by which the weight 6 can be retained at the top of the rod 5 in such a position that the said spring is compressed. This can be done in any conventional manner and even by hand. For example, wing nut 22 is illustrated in FIGURE 2, and is screwed through the weight 6 to hold the weight 6 in contact with the rod 5. Upon loosening of wing nut 22, the weight is projected downwardly towards the lower spring 7. When the instrument is used, the retaining means is released so that the spring repels the weight 6 rapidly down the rod 5 into engagement with the spring 7 disposed at the lower end of the rod 5.

The calibrated tape 9 may, if desired, be replaced by other calibrated means such as a rule, or, alternatively suitable calibrations may be scored on the surface of the rod 5 itself. In view of the fact that the instrument is intended for use in the open air under a variety of weather conditions, it is preferred that most or all the parts thereof should be formed from metals resistant to corrosion such, for example, as stainless steel.

When the instrument which has been described with reference to the drawing is formed substantially wholly from stainless steel, its total weight is about 9¼ lbs. and its total height is 66″. It is emphasized that the weights and measurements which have been stated above are given purely by way of example and that an instrument in accordance with the invention may have any other convenient dimensions in accordance with the particular purpose for which it is intended.

I claim:
1. An instrument for indicating the relative softness and texture of the ground surface, wherein a free falling mass causes energization of resilient means, the free falling mass being sequentially rebounded by the resilient means, the latter resilient means being in ground engaging contact and the terminus of rebound being measured, said instrument which comprises:
 (A) ground impact contacting means adapted to rest on an exposed layer comprising the surface of the ground;
 (B) guide means in vertical extension of said contacting means;
 (C) a movable mass, slidably engaging the guide means, said movable mass being held above the ground impact contacting means for free gravitational fall in the direction of the ground impact contacting means;
 (D) resilient means wound around said guide means and interposed between said movable mass and said ground impact contacting means, adjacent to the ground impact contacting means and in the path of the movable mass but spaced therefrom, said resilient means rebounding the mass upon energization of the resilient means by the falling mass upon its falling in the direction of the ground impact contacting means;
 (E) a calibrated scale in parallel relationship with the vertical guide means to record the distance of rebound travel of the movable mass, thereby providing an indication of the relative softness and texture of the ground.

2. The instrument as described in claim 1, wherein additional resilient means are provided at the upper end of said guide, and wherein retaining means are attached to said guide to retain said additional resilient means in a stressed position, a release for said retaining means upon the operation of which the movable mass is urged by the combination of gravity and the force provided by the stressed additional resilient means to urge said movable mass rapidly down the guide.

3. The instrument as described in claim 1, wherein said guide is formed in at least two releasably convertible sections to vary the falling distance of said movable mass.

4. An instrument for indicating the relative softness created by contiguous layers of the ground surface wherein a free falling mass causes energization of resilient means, the free falling mass being sequentially rebounded by the resilient means, the latter resilient means being in ground engaging contact and the terminus of rebound being measured, said instrument which comprises:
 (A) ground impact contacting means adapted to rest on an exposed layer comprising the surface of the ground;
 (B) guide means in vertical extension of said contacting means;
 (C) a movable mass, slidably engaging the guide means, said movable mass being held above the ground impact contacting means for free gravitational fall in the direction of the ground impact contacting means;
 (D) resilient means wound around said guide means and interposed between said movable mass and said ground impact contacting means, adjacent to the ground impact contacting means and in the path of the movable mass but spaced therefrom, said resilient means rebounding the mass upon energization of the resilient means by the falling mass upon its falling in the direction of the ground impact contacting means;
 (E) a calibrated scale coextensive with the vertical guide to record the distance of rebound travel of the movable mass, thereby providing an indication of the relative softness and texture of the ground.

References Cited by the Examiner

UNITED STATES PATENTS

| | | | |
|---|---|---|---|
| 1,282,928 | 10/18 | Peirce | 81—52.35 X |
| 1,586,363 | 5/26 | Hall | 73—79 |
| 1,762,639 | 6/30 | Roudie | 73—79 |
| 2,477,094 | 7/49 | Shropshire | 73—84 |
| 2,677,961 | 5/54 | Peabody | 73—79 |

FOREIGN PATENTS

| | | |
|---|---|---|
| 153,621 | 11/20 | Great Britain. |
| 595,191 | 11/47 | Great Britain. |

RICHARD C. QUEISSER, *Primary Examiner.*

DAVID SCHONBERG, *Examiner.*